United States Patent [19]
Miyazawa et al.

[11] Patent Number: 6,027,389
[45] Date of Patent: Feb. 22, 2000

[54] PRODUCTION OF CERAMIC TUBES FOR METAL HALIDE LAMPS

[75] Inventors: Sugio Miyazawa, Kasugai; Michio Asai, Nagoya, both of Japan

[73] Assignee: NGK Insulators, Ltd., Japan

[21] Appl. No.: 08/917,603

[22] Filed: Aug. 26, 1997

[30] Foreign Application Priority Data

Aug. 30, 1996 [JP] Japan ..................... 8-230196

[51] Int. Cl.$^7$ ........................................ H01J 9/00
[52] U.S. Cl. .............................. 445/26; 445/22
[58] Field of Search ........................ 445/22, 26

[56] References Cited

U.S. PATENT DOCUMENTS

| | | | |
|---|---|---|---|
| 3,564,328 | 2/1971 | Bagley | 445/22 |
| 4,155,758 | 5/1979 | Evans et al. | |
| 4,503,356 | 3/1985 | Kobayashi et al. | 445/22 |
| 4,800,320 | 1/1989 | Kajihara et al. | |
| 5,468,168 | 11/1995 | Balaschak et al. | 445/26 |

FOREIGN PATENT DOCUMENTS

| | | |
|---|---|---|
| 0074188 | 3/1983 | European Pat. Off. |
| 0331154 | 9/1989 | European Pat. Off. |
| 0587238 | 3/1994 | European Pat. Off. |
| 94/06727 | 3/1994 | WIPO |

*Primary Examiner*—Nimeshkumar D. Patel
*Assistant Examiner*—Todd Reed Hopper
*Attorney, Agent, or Firm*—Parkhurst & Wendell, L.L.P

[57] ABSTRACT

A process to produce a ceramic tube for a metallic halide lamp, comprising the steps of forming an integrally molded body composed of an electrode member-inserting portion and an annular portion located around an outer periphery of the electrode member-inserting portion, inserting the annular portion of the integrally molded body into an open end portion of a molded cylindrical tubular body in a state that each of the integrally molded body and the molded tubular body is used as molded or after being calcined, thereby forming an assembled body, and firing the assembled body, thereby forming an integrally fired body composed of the electrode member-inserting portion and the annular portion, whereas the annular portion and the tubular body are sintered to each other by firing in a state that radial press fitting forces act between the annular portion and the tubular body, the ceramic tube being constituted by the cylindrical tubular body containing a discharging space with open end portions at both ends thereof, the annular portions provided at the open end portions of the tubular body, and electrode member-inserting portions fixed at the opposite ends of the tubular body through the annular portions, respectively.

6 Claims, 7 Drawing Sheets

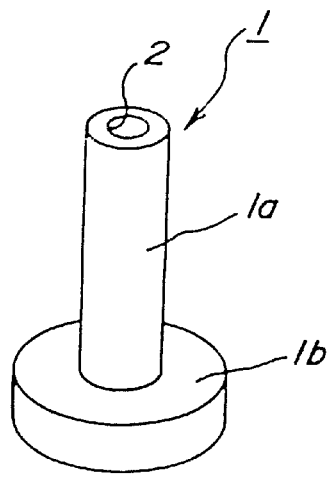
FIG_1a
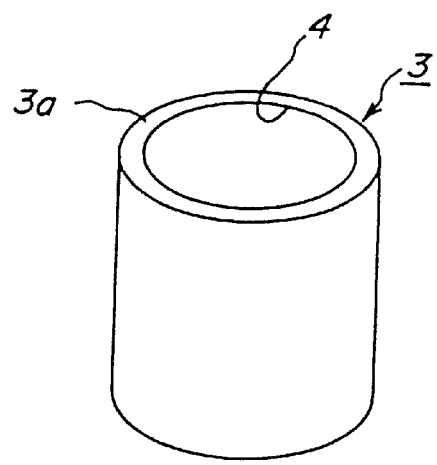
FIG_1b
FIG_2
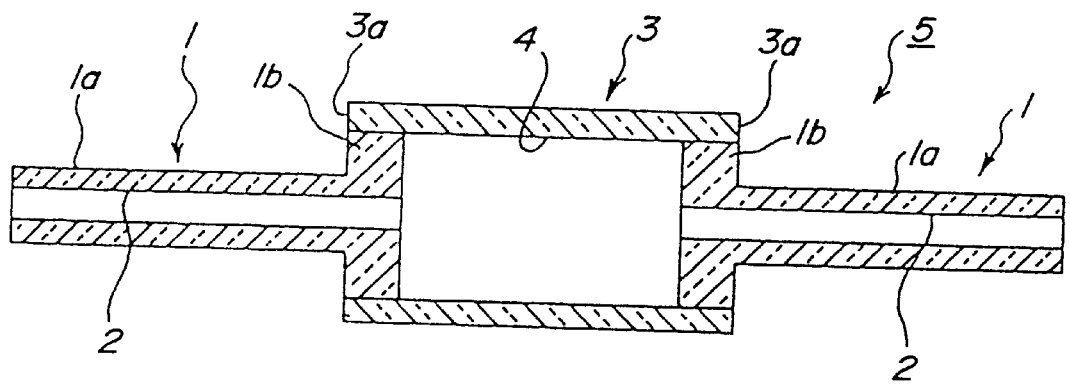

FIG_4a
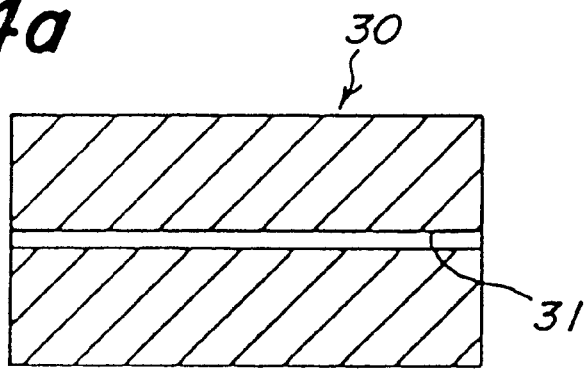
FIG_4b
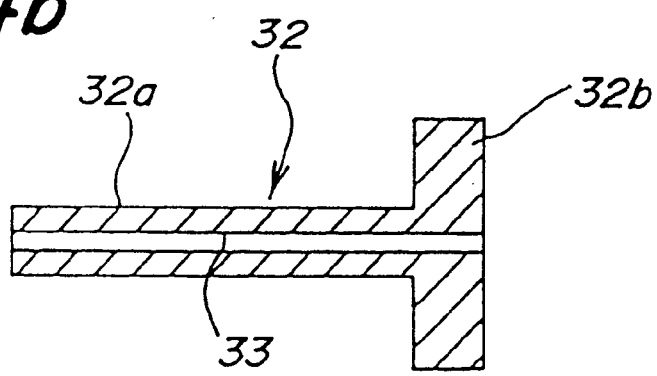
FIG_4c
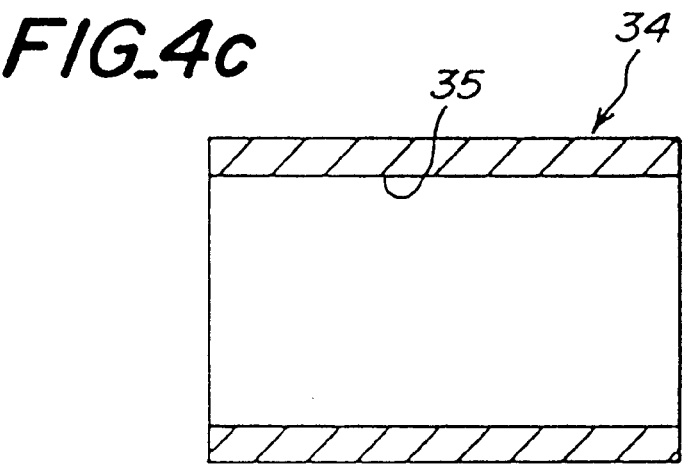

FIG_5
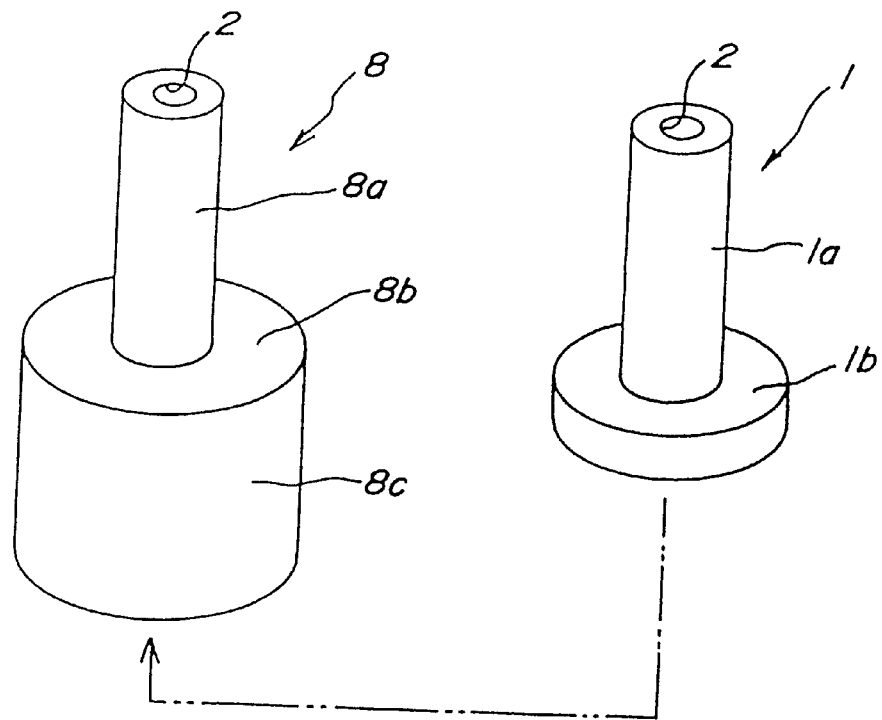
FIG_6
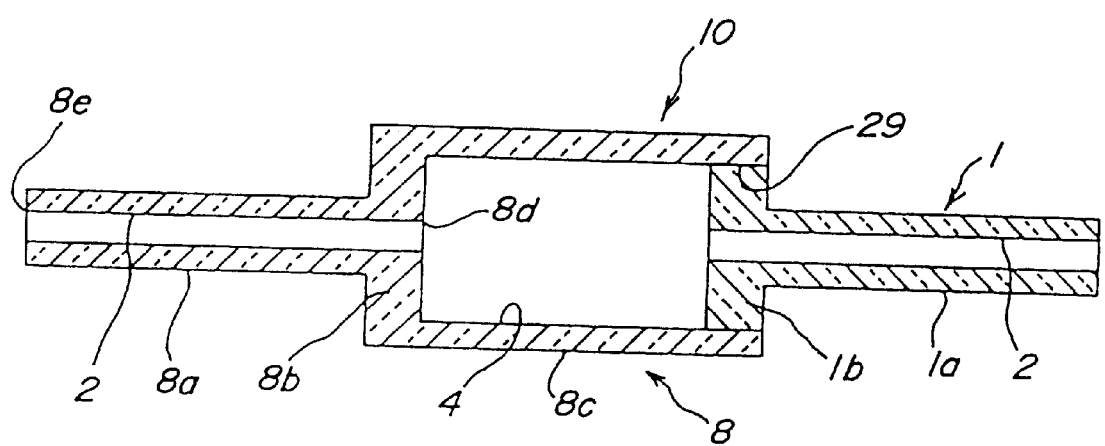

FIG_8a
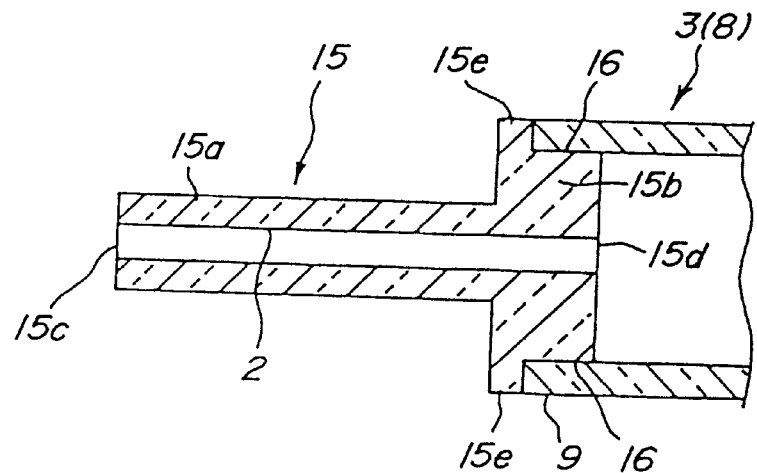
FIG_8b
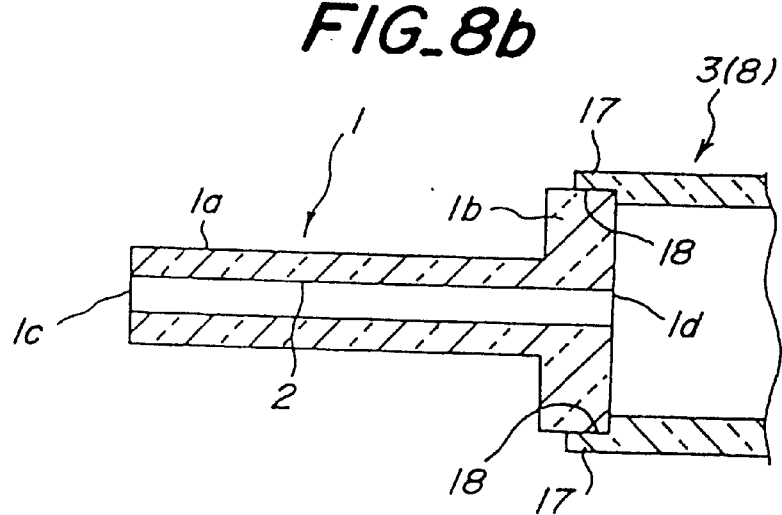
FIG_8c
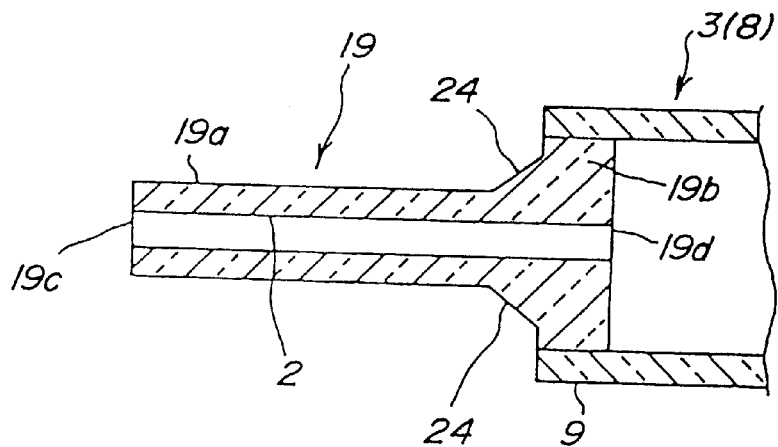

FIG_9
PRIOR ART
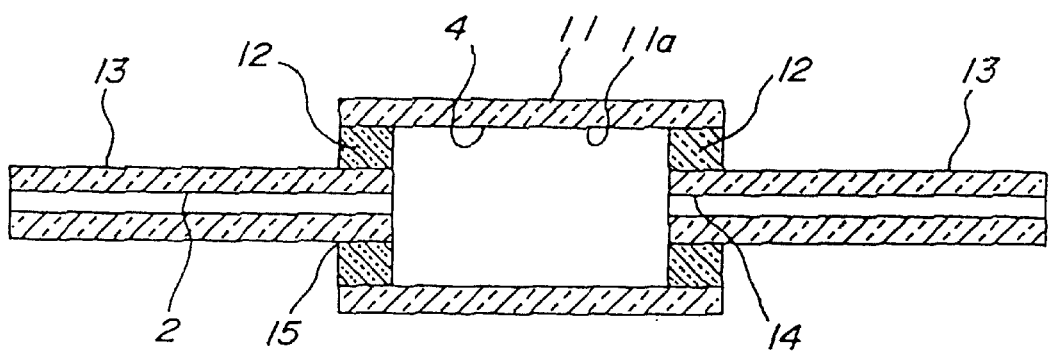

_(1)_

PRODUCTION OF CERAMIC TUBES FOR METAL HALIDE LAMPS

BACKGROUND OF THE INVENTION

RELATED ART STATEMENT

A high intensity discharge lamp filled with an ionizable material containing a metal halide compound is disclosed in U.S. Pat. No. 4,409,517. As a metal constituting electrodes for the high intensity discharge lamps of this kind, niobium, tantalum or the like have been used because the metal is required to have a coefficient of thermal expansion near that of a ceramic tube, particularly, an alumina tube. However, niobium and tantalum have not necessarily resistance large enough to withstand the halogen. For this reason, JP-A-6 196,131 disclosed use of a ceramic tube designed as shown in FIG. 9.

This ceramic tube includes a tubular body 11 in which a discharging space 4 is formed, a pair of annular members 12 inserted into opposite open end portions of the tubular body 11, and slender, cylindrical electrode-inserting members 13 fixedly inserted into central openings of the annular member 12, respectively. Pressure is exerted between the inner peripheral face 11a of the tubular body 11 and each of the annular member 12 and between the annular member 12 and the electrode-inserting member 13 due to firing shrinkage. Thereby, the members 11, 12 and 13 are integrally sintered through the firing shrinkage so that gas tightness may be maintained among them. An electrode member not shown is inserted through a space 2 of each of the electrode-inserting members 13.

SUMMARY OF THE INVENTION

The present inventors have continuously made concentrated studies to realize mass production and commercialization of such ceramic tubes. More particularly, the inventors first prepared an assembly by inserting a calcined preform of the electrode-inserting member (end member) 13 into a calcined preform of the annular member 12, and fired the assembly. At that time, the annular member 12 and the end member 13 were made such that the outer diameter of the end member 13 might be slightly greater than the inner diameter of the central hole of the annular member 12 after the firing, if the end member 13 and the annular member 12 are separately fired at an appropriate. By so doing, appropriate compression stress occurs between the annular member 12 and the end member 13, so that gas tightness is maintained between them. Similarly, gas tightness is maintained by the compression stress between the tubular body 11 and the annular member 12 owing to a dimensional difference after the firing shrinkage of them.

However, it was clarified that the following problem was still unsolved in the above producing process. That is, there was a tendency that the inner diameter of the end member or the electrode-inserting member 13, that is, the dimension of the space 2 to receive the electrode member became smaller at a portion 14 held in the annular member 12 than at the remainder of the space 2. For example, if the inner diameter of the end portion 13 is set at 0.65 to 1.4 mm as measured after the firing, there was a tendency that the inner diameter of the electrode-inserting member 13 inside the portion 14 was smaller than that of the remainder by about 0.02 to about 0.03 mm.

However, it was figured out that the above-mentioned producing process still had the following problems. That is, if stress is given to the end member 13, microcracks are likely to be from a vicinity of an edge 15 of the annular member 12 due to influence of residual stress caused by the integral sintering probably in shrinkage fitting. Consequently, fitting strength of the end member 13 may be decreased.

In order to lessen the difference in inner diameter and increase the fitting strength, a decrease the in difference between the outer diameter of the end member 13 and the inner diameter of the annular member 12 had been examined. However, it was figured out that in this case, gas might leak through an interface between the end member 13 and the annular member 12.

It is an object of the present invention to provide a process to produce a ceramic tube for metallic halide ceramic lamp, which process can prevent the inner diameter of the end member for receiving the electrode member from being decreased at a location where the end member contacts the annular member, increase the fitting strength of the end member to the tubular body, and diminish the possibility that the gas may leak through the interface between the end member and the annular member.

The process to produce a ceramic tube for a metallic halide lamp according to the present invention, comprises the steps of forming an integrally shaped body composed of an electrode member-inserting portion and an annular portion located around an outer periphery of the electrode member-inserting portion, inserting the annular portion of the integrally shaped body into an open end portion of a shaped cylindrical tubular body in a state that each of the integrally molded body and the molded tubular body is used as molded or after being calcined, thereby forming an assembled body, and firing the assembled body, thereby forming an integrally fired body composed of the electrode member-inserting portion and the annular portion, whereas the annular portion and the tubular body are sintered to each other by firing in a state that radial press fitting forces act between the annular portion and the tubular body, said ceramic tube being constituted by the cylindrical tubular body containing a discharging space with open end portions at both ends thereof, the annular portions provided at the open end portions of the tubular body, and electrode member-inserting portions fixed at the opposite ends of the tubular body through the annular portions, respectively. The term "cylindrical" used in the specification and the claims is intended to include "fusiform".

As mentioned above, the present inventors reached the technical idea that the annular portion and the electrode member-inserting portion are integrally molded, and the annular portion of the integrally molded body is inserted into the open end portion of the molded cylindrical tubular body in a state that each of the integrally molded body and the molded tubular body is used as it is or after being calcined, thereby forming the assembled body, and the assembled body is fired. As a result, it is clarified that the inner diameter of an inner hole of the cylindrical electrode member-inserting portion through which the electrode member is to be inserted can be prevented from being decreased at a location where the cylindrical electrode member-inserting portion continues to the annular member, and the fitting strength of the end member to the tubular body is largely increased and stabilized. In addition, the possibility that gas leaks through an interface between the electrode member-inserting portion and the annular portion can be avoided. Therefore, the process of the present invention is a just epoch-making technique from the standpoint of the mass production and the practical application of high intensity discharge lamps.

These and other objects, features and advantages of the invention when conjunction in with the attached drawing, with the understanding that some modifications, variations and changes of the same could be easily made.

BRIEF DESCRIPTION OF THE ATTACHED DRAWINGS

For a better understanding of the invention, reference is made to the attached drawings, wherein:

FIG. 1(a) is a perspective view of a first molded or then calcined body 1, and

FIG. 1(b) is a perspective view of a molded or then calcined body 3 of a tubular body;

Figure 3:
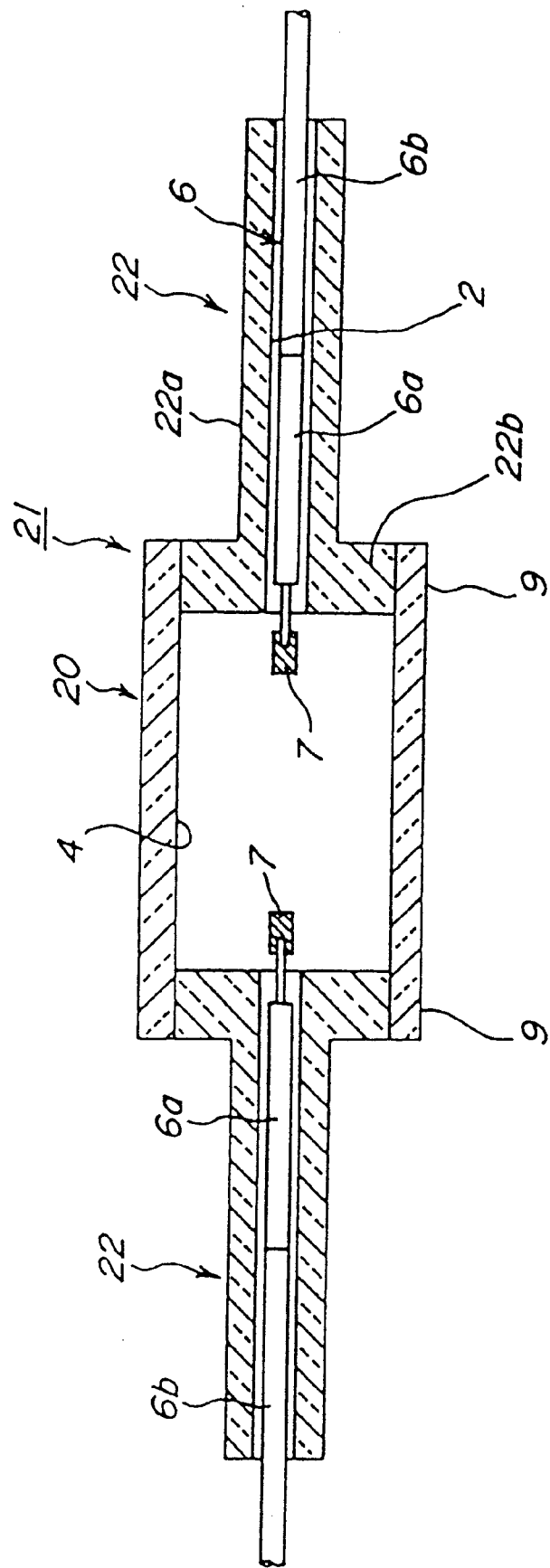

FIG. 2 is a sectional view for illustrating an assembled body 5 obtained by assembling two first molded or then calcined bodies 1 to a molded or then calcined body of a tubular body 3;

FIG. 3 is a sectional view of a ceramic tube 21 for a metal halide lamp obtained by firing the assembled body in FIG. 2;

FIG. 4(a) is a sectional view showing an extruded body 30,

FIG. 4(b) is a sectional view illustrating a first shaped body obtained by grinding the molded body in FIG. 4(a), and FIG. 4(c) is a sectional view for illustrating a molded tubular body obtained by an powder pressing molded.

Figure 7:
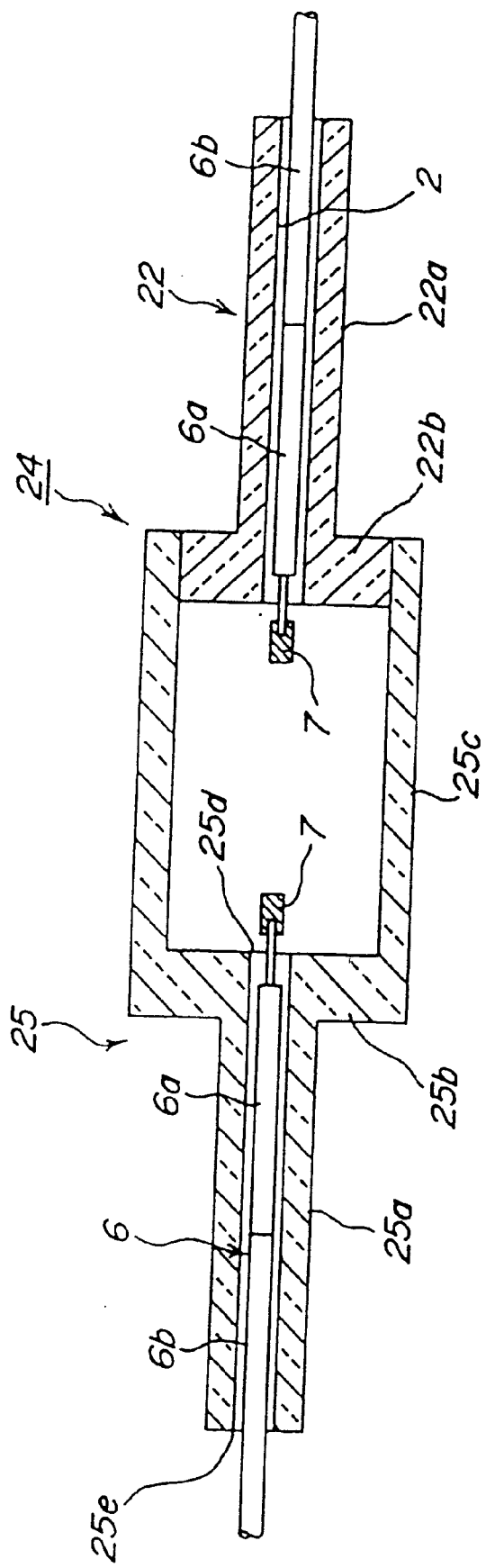

FIG. 5 is a perspective view for illustrating the state before a first molded or then calcined body 1 is combined with a second molded or then calcined body 8 having a tubular body, annular portion and an electrode-inserting portion;

FIG. 6 is a sectional view for illustrating an assembled body 10 obtained by assembling the first molded or then calcined body 1 with the second molded or then calcined body 8;

FIG. 7 is a sectional view for illustrating a ceramic tube 24 for a metal halide lamp obtained by firing the assembled body in FIG. 6;

FIGS. 8(a), (b) and (c) are sectional views for illustrating principal portions of assembled bodies each obtained by assembling a first molded or then calcined body 1, 15, 19 with a molded or then calcined body of a tubular body; and FIG. 9 is a sectional view for illustrating an assembled body obtained by assembling a first molded body of a tubular body, molded bodies of annular portions and molded bodies of electrode member-inserting portions.

In the present invention, the tubular body and the end member are of a ceramic material, but the ceramic material is not limited to a specific type. However, the ceramic material needs to have a corrosion resistance against a halogen-based corrosive gas, and alumina, yttoria, YAG, etc. are preferred for them.

The configuration of an electrode member to be inserted through the electrode member-inserting portion is not specifically limited. As a material for the electrode member, various high melting point metals, and conductive ceramics may be used. From the standpoint of the conductivity, the high melting point metals are preferred. As such high melting point metals, at least one of metals selected from the group consisting of molybdenum, tungsten, rhenium, niobium, tantalum, and alloys thereof are preferred.

Among them, it is known that the niobium and tantalum have coefficients of expansion which are almost coincident with that of a ceramic material, particularly alumina ceramic, constituting the tubular body and the end members of the ceramic discharge tube, but these metals are likely to be corroded with metal halide. Therefore, in order to prolong the service life of the conductive member, it is preferable that the conductive member is made of a metal selected from the group consisting of molybdenum, tungsten, rhenium and their alloys. These metals which are highly resistive against the metal halide generally have small coefficients of thermal expansion. For example, the coefficient of thermal expansion of alumina ceramics is $8 \times 10^{-6} K^{-1}$, and that of molybdenum is $6 \times 10^{-6} K^{-1}$, whereas that of tungsten and rhenium is less than $6 \times 10^{-6} K^{-1}$.

For this reason, it is preferable that a portion of the electrode member near to the discharge space of the tubular body is made of a metal selected from the group consisting of molybdenum, tungsten, rhenium and their alloys, whereas a portion not facing the discharge space is made of niobium or tantalum.

In the process for producing the ceramic tube according to the present invention, the annular portion and the tubular body are preferably designed such that when separately fired in the state that the integrally molded body of the electrode member-inserting portion and the annular body is not fitted to the molded tubular body, the outer diameter of the fired annular portion 1b is not less than 1.001 times as much as the inner diameter of the fired tubular body 3. Further, in order to further suppress thermal stress between the annular portion and the tubular body, the outer diameter of the fired annular portion is not more than 1.010 times as much as the inner diameter of the tubular body.

In the process for producing the ceramic tube according to the present invention, the assembled body is formed by inserting the annular portion into the open end portion of the cylindrical tubular body in the state that each of the integrally molded body of the annular body and the electrode member-inserting portion and the tubular body is molded or calcined. In order to easily effect the above insertion, the outer diameter of the annular portion of the integrally molded body is made smaller than the inner diameter of the open end portion of the molded tubular body in the state that each of the integrally molded body of the annular body and the electrode member-inserting portion and the tubular body is molded or calcined. In order to make the outer diameter of the annular body smaller than that of the inner diameter of the open end portion of the tubular body, "the following ways may be used.

(1) The firing shrinkage factor of the annular body is made smaller than that of the tubular body by controlling the density of each of the shaped bodies thereof.
(2) The annular body only is slightly calcined to be shrunk.
(3) The annular body and the tubular body are both calcined, provided that the calcined degree of the annular body is greater than that of the tubular body."

According to the present invention, it may be that a pair of the integrally molded bodies each composed of the electrode member-inserting portion and the annular portion are prepared, an assembled body is formed by inserting the annular portion of each of the integrally molded bodies into an end open portion of the tubular body in the state that each of the integrally molded body and the tubular body is molded as it is or after calcined, and the assembled body is fired. This preferred embodiment will be explained with reference to FIGS. 1 through 3.

FIG. 1(a) is a perspective view of a first integrally molded body 1 as being molded or calcined. This molded or calcined body 1 has an electrode member-inserting portion 1a and an annular portion 1b. FIG. 1(b) is a perspective view of a second molded body 3 as molded or calcined (a molded or calcined tubular body), in which a discharging space 4 is defined. As shown in FIG. 2, an assembled body 5 is obtained by the annular portion lb of the first molded or calcined body 1 into one of open end portions 3a of the molded or calcined tubular body 3.

The assembled body is fired at a given temperature as it is, and a tube 21 for a metal halide lamp can be obtained as shown in FIG. 3. This tube 21 includes one tubular body 20 and a pair of the integrally fired bodies 22. The annular body 22b of each of the integrally fired body 22 is fitted into the end portion of the tubular body 20 and integrally sintered to the tubular body as in shrinkage fitting. An electrode member 6 is inserted into the electrode member-inserting portion 22a of the integrally molded body 22. Preferably, a gap between the outer periphery of the electrode member 6 and the inner peripheral surface of the electrode member-inserting portion is 0.02 to 0.10 mm.

In a preferred embodiment, a portion 6a of the electrode member 6 facing the discharging space 4 is made of a metal having high corrosion resistance against the halogen gas, whereas a terminal end portion 6b of the electrode member 6 is made of a metal having a coefficient of thermal expansion near to that of the above-mentioned ceramic tube. A given electrode unit 7 is fitted to an end portion of the electrode member 6.

In the following, the above embodiment of the present invention will be explained with reference to concrete experimental results.

(Experiment 1)

To alumina powder having high purity of not less than 99.9% were added 750 ppm of magnesium oxide, 2 wt % of polyvinyl alcohol, 0.5 wt % of polyethylene glycol, and 50 wt % of water, and granulated powder having the average particle diameter of about 70 µm was obtained by milling and mixing the resulting mixture in a ball mill for one hour and drying the resulting at near 200° C.

The thus obtained granulated powder was press molded under pressure of 2000 kg/cm², thereby obtaining two integrally molded bodies 1 and a molded body 3 of a tubular body as shown in FIGS. 1(a) and 1(b). At that time, the dimensions of the integrally molded bodies 1 and the molded body 3 were adjusted such that if they are separately fired, the outer diameter of the annular body 22b would be greater than the inner diameter of the tubular body 20 by 1.001 to 1.010 times.

Then, one of the molded bodies 1 was calcined at 1200° to shrink its dimension, and the calcined body 1 was inserted into one of open end portions of the molded body 3 of the tubular body, as shown in FIG. 2, to produce an assembled body 5. The thus assembled body was calcined at 1200° C., so that the molded body 3 of the tubular body was shrunk and both were joined to each other based on their original difference in dimension. Next, the other molded body 1 was calcined at 1300° C., and inserted into the other open end portion of the calcined body 3 of the tubular body, thereby obtaining a final assembled body. This assembled body was fired at 1800° C. in a hydrogen atmosphere, thereby firmly joining the above constituent parts as shown in FIG. 3.

With respect to the thus obtained ceramic tube 21, a difference between the inner diameter of the hollow space 2 at a location in an area 9 inside the tubular body 20 and the inner diameter of the hollow space 2 at other portion was measured to be about 0.01 mm.

Further, bending strength was measured by contacting a probe of a strength tester with the electrode member-inserting portion 22a at a location speed from a base end thereof by 10 mm and applying a load to the electrode member-inserting portion through the probe in a vertical direction. As a result, bending strength was 29 kgf/cm².

(Experiment 2)

To alumina powder having high purity of not less than 99.9% were added 750 ppm of magnesium oxide, 4 wt % of methyl cellulose, 2 wt % of polyethylene oxide, 5 wt % of stearic acid and 23 wt % of water, and the resulting mixture was kneaded in a kneader for 15 minutes. An extruded body 30 shown in FIG. 4(a) was obtained by extruding the kneaded mixture under extruding pressure of 15 kg/cm² and drying an extrudate. A through-hole 31 was formed through the extruded body 30.

An integrally shaped body 32 as shown in FIG. 4(b) was obtained by cutting the above extruded body 30. The integrally shaped body 32 had portions 32a and 32b which were to constitute an electrode member-inserting portion and an annular portion after firing, respectively, and a hollow space 33 was formed in the portion 32a. A molded body 34 as shown in FIG. 4(c) was obtained by the powder pressing process mentioned above. Inside the molded body 34 was formed a hollow space 35 for constituting a discharging space. In this case, the integrally shaped body 32 and the molded body 34 for the tubular body were dimensionally adjusted such that if they are separately fired, the outer diameter of the annular portion 22b would be greater than the inner diameter of the tubular body 20 by 1.001 to 1.010 times.

Then, one of the integrally shaped body 32 was calcined at 1200° C. to shrink its dimension, thereby obtaining a calcined body 1, and the calcined body 1 was inserted into one of open end portions of the molded body 34 of the tubular body, as shown in FIG. 2, to produce an assembled body. The thus assembled body was calcined at 1200° C., so that the molded body of the tubular body was shrunk and both were joined to each other based on their original difference in dimension. Next, the other molded body 32 was calcined at 1300° C., and inserted into the other open end portion of the calcined body 3 of the tubular body, thereby obtaining a final assembled body 5. This assembled body was fired at 1800° C. in a hydrogen atmosphere, thereby firmly joining the above constituent parts as shown in FIG. 3.

With respect to the thus obtained ceramic tube 21, a difference between the inner diameter of the hollow space 2 at a location in an area 9 inside the tubular body 20 and the inner diameter of the hollow space 2 at other portion was measured to be about 0.01 mm.

Further, bending strength was measured by contacting a probe of a strength tester with the electrode member-inserting portion 22a at a location spaced from a base portion thereof by 10 mm and applying a load to the electrode member-inserting portion through the probe in a vertical direction. As a result, bending strength was 27 kgf/cm².

(Comparative Experiment)

To alumina powder having high purity of not less than 99.9% were added 750 ppm of magnesium oxide, 2 wt % of polyvinyl alcohol, 0.5 wt % of polyethylene glycol, and 50 wt % of water, and the resulting mixture was milled and mixed in a ball mill for one hour. Granulated powder having the average particle diameter of about 70 µm was obtained by drying the milled and mixed powder at near 200° C. in a spray dryer.

Molded bodies 11, 12 as shown in FIG. 9 were produced by press molding the thus granulated powder under pressure of 1000 kg/cm². On the other hand, to alumina powder having high purity of not less than 99.9% were added 750 ppm of magnesium oxide, 4 wt % of methyl cellulose, 2 wt % of polyethylene oxide, 5 wt % of stearic acid and 23 wt % of water, and the resulting mixture was kneaded in a kneader mill for 15 minutes. An extruded body 13 was produced by injection molding the kneaded mixture under extruding pressure of 15 kg/cm², drying the resulting extrudate and cutting it.

In this case, the molded bodies 11 and 12 were dimensionally adjusted such that if they are separately fired, the outer diameter of the annular portion would be greater than the inner diameter of the tubular body by 1.001 to 1.010 times. Further, the molded bodies 12 and 13 were dimensionally adjusted such that if they are separately fired, the outer diameter of the electrode member-inserting portion would be greater than the inner diameter of the annular portion by 1.001 to 1.010 times.

Next, two assembled bodies were produced each by calcining the molded body 13 at 1300° C. and inserting the calcined body 13 into the molded body 12. One of the assembled bodies was calcined at 1200° C., and the other calcined at 1300° C. The molded body 12 of the assembled body calcined at 1200° C. was inserted into the molded body 11 of the tubular body, which were calcined at 1200° C. The thus calcined assembly was combined with the assembled body calcined above at 1300° C. The entire assembly was fired at 1800° C. in a hydrogen atmosphere, thereby joining the constituent parts together.

With respect to the thus obtained ceramic tube, a difference between the inner diameter of the hollow space 2 at a location in an area inside the tubular body and the inner diameter of the hollow space 2 at other portion was measured to be about 0.03 mm.

Further, bending strength was measured by contacting a probe of a strength tester with the electrode member-inserting portion 22a at a location spaced from a base portion thereof by 10 mm and applying a load to the electrode member-inserting portion through the probe in a vertical direction. As a result, bending strength was 14 kgf/cm².

A first integrally molded or then calcined body composed of an electrode member-inserting portion and an annular portion located around one end of the electrode member-inserting portion is prepared. A second integrally molded or then calcined body composed of a tubular body, an annular portion radially inwardly located at one end of the tubular body and an electrode member-inserting portion located at one end in a central hole of the annular portion is prepared. The second molded or then calcined body is provided with an opening on a side opposite to its electrode member-inserting portion. An assembly is formed by inserting the annular portion of the first molded or then calcined body into the above opening of the second molded or then calcined body. The finally assembled body is fired, so that the first molded or then calcined body composed of the electrode member-inserting portion is integrally fired, and the second molded or then calcined body composed of the electrode member-inserting portion, the annular portion and the tubular body is integrally fired, whereas the annular portion of the first molded or then calcined body is sintered with the tubular body of the second one in the state that the former and the latter are in shrinkage fitting engagement.

FIG. 5 is a perspective view for illustrating such a second integrally molded or then calcined body 8. A reference numeral 8a denotes an electrode member-inserting portion, and reference numerals 8b and 8c denote an annular portion and a tubular portion, respectively. A first integrally molded or then calcined body is shown right by 1 in FIG. 5. As is seen in FIG. 6, an opening 29 is provided in one end of the second integrally molded or then calcined body 8, and an annular portion 1b of the first integrally molded or then calcined body 1 is inserted into the opening 29. A reference numeral 8d denotes an opening of a hollow space 2 on a side of a discharging space 4, whereas a reference numeral 8e denotes an opening of the hollow space on an exterior side.

In this case, the annular portion and the tubular body are preferably designed such that when separately fired in the state that the first integrally molded body 1 is not fitted to the second molded body 8, the outer diameter of the fired annular portion 1b is not less than 1.001 times as much as the inner diameter of the fired tubular body. Thereby, both can be more firmly joined together. In order to suppress thermal stress between the annular portion and the tubular body, the outer diameter of the fired annular portion is preferably not more than 1.010 times as much as the inner diameter of the tubular body.

The assembled body is fired at a given temperature in the above state, and a tube 24 for a metal halide lamp can be obtained as shown in FIG. 7. This tube 24 includes the integrally fired body 22 and the integrally fired body 25. The integrally fired body 25 includes an electrode member-inserting portion 25a, the annular portion 25b and the tubular portion 25c. The annular portion 22b of the integrally fired body 22 is inserted into the end opening of the tubular body 25c, and both are integrally sintered as in the shrinkage fitting. A reference numeral 25d denotes an opening of a hollow space 2 on a side of the discharging space 4, and a reference numeral 25e denotes an opening of the hollow space 2 on an exterior side. An electrode member 6 is inserted into the electrode member-inserting portion 25a. A gap between the outer periphery of the electrode member 6 and the inner peripheral surface of the electrode member-inserting portion 25a is preferably 0.02 to 0.10 mm.

In the following, more specific experimental results will be shown below.

(Experiment 3)

To alumina powder having high purity of not less than 99.9 wt % were added 750 ppm of magnesium oxide, 5 wt % of polyvinyl alcohol, 4 wt % of polystyrene, 4 wt % of acrylic resin, 1 wt % of stearic acid and 1 wt % of DOP, and pellets having a diameter of about 3 mm were granulated from the resulting mixture by using a continuous extruding kneader. Injection molding was effected with use of the above pellets at a resin temperature of 180° C., an injection speed of 2.5 cc/sec. and an injection pressure of 600 kg/cm², and a gate portion was cut off. Thereby, moldings 1 and 8 as shown in FIG. 5 were produced.

At that time, the molded bodies 1, 8 were dimensionally designed such that when separately fired, the outer diameter of the fired annular portion 22b was not less than 1.001 times but not more than 1.010 as much as the inner diameter of the fired tubular body 25c.

Next, the molded body 1 was dewaxed by heating it up to 450° C. at a heating rate of 5° C./min., and calcined and shrunk at 1200° C., thereby obtaining a calcined body. The annular portion of this calcined body was inserted into the molded body 8, thereby obtaining an assembled body. This assembled body was fired at 1800° C. in hydrogen atmosphere, thereby firmly joining the constituent parts as shown in FIG. 7.

With respect to the thus obtained ceramic tube 24, a difference between the inner diameter of the hollow space 2 at a location in an area 9 inside the tubular body 25c and the inner diameter of the hollow space 2 at other portion was measured to be about 0.01 mm.

Further, bending strength was measured by contacting a probe of a strength tester with the electrode member-inserting portion 22a at a location spaced from a base portion thereof by 10 mm and applying a load to the electrode member-inserting portion through the probe in a vertical direction. As a result, bending strength was 29 kgf/cm$^2$.

In the present invention, it is particularly preferable that the annular portion of the first integrally molded or then calcined body and the molded or then calcined tubular body have corresponding shapes which enable them to engage with each other. In the first molded or then calcined body, a C-section curved face or R-section curved face may be formed at a joint between the electrode member-inserting portion and the annular portion.

FIGS. 8(a), 8(b) and 8(c) show in principal portions that an annular portion 1, 15, 19 of an integrally molded or then calcined body 3 which is composed of an electrode member-inserting portion and the above annular portion is fixedly inserted into a molded or then calcined body 3 of a tubular body or an integrally molded or then calcined body 8 composed of a tubular body, an annular body and an electrode member-inserting member. As described before, although the cylindrical tubular bodies are illustrated in the drawings, fusiform tubular bodies may be used.

In FIG. 8(a), the integrally molded or then calcined body 15 includes the electrode member-inserting portion 15a and the annular portion 15b, and a hollow space 2 in the electrode member-inserting portion 15b is opened at 15c and 15d. A cut portion 16 is formed at an interior edge of the annular portion 15b on its outer peripheral side. An end portion of the molded or then calcined body 3 (8) is fitted to the cut portion 16, while the end face of the molded then calcined body 3 (8) is butted against an annular projection.

In FIG. 8(b), the integrally molded or then calcined body has the same configurations as mentioned before. On the other hand, a cut portion 18 is formed at an inner side of an end portion of the molded or then calcined body 3 (8). By so constructed, an end portion of the molded or then calcined body 8 is fitted to the cut portion 18, and held by the projection 17.

In this way, when the annular portion of the first integrally molded or then calcined body and the molded or then calcined tubular body are designed to have corresponding shapes which enable them to engage with each other, the both molded or then calcined bodies can be easily and accurately located in obtaining the assembled body thereof.

In FIG. 8(c), the integrally molded or then calcined body 19 includes an electrode member-inserting portion 19a and an annular portion 19b, and a hollow space 2 inside the electrode member-inserting portion 19b is opened at 19c and 19d. In the first molded or then calcined body 19, a C-section curved face or R-section curved face is provided at a joint between the electrode member-inserting portion 19a and the annular portion 19b. By so constructing, bending strength of the electrode member-inserting portion 19a can be further increased. This is considered that crack becomes unlikely to develop at a location where stress acts.

As mentioned above, according to the present invention, when the ceramic tube having a specific structure for a metal halide lamp is to be produced, reduction in the inner diameter of the electrode-inserting portion at a location where the electrode member-inserting portion continues to the annular portion can be prevented. Further, the fitting strength of the end member composed of the electrode member-inserting portion and the annular portion and fitted to the tubular body can be enhanced. Furthermore, the possibility that gas leaks through an interface between the end member and the annular member can be diminished.

What is claimed is:

1. A process for producing a ceramic tube for a metallic halide lamp, comprising:

forming an integrally molded body comprised of an electrode member-inserting portion and an annular portion located around an outer periphery of the electrode member-inserting portion;

inserting the annular portion of the integrally molded body into an open end portion of a molded cylindrical tubular body in a state that each of the integrally molded body and the molded tubular body is used as molded or after being calcined, thereby forming an assembled body; and, firing the assembled body, thereby forming an integrally fired body comprised of the electrode member-inserting portion and the annular portion, whereas the annular portion and the tubular body are sintered to each other by firing in a state that radial press fitting forces act between the annular portion and the tubular body, said ceramic tube being comprised of the cylindrical tubular body containing a discharging space with open end portions at both ends thereof, the annular portions provided at the open end portions of the tubular body, and electrode member-inserting portions fixed at the opposite ends of the tubular body through the annular portions, respectively.

2. The producing process set forth in claim 1, further comprising:

preparing a pair of the first molded or then calcined bodies, said first molded or then calcined bodies each comprising the electrode member-inserting portion and the annular portion;

preparing a molded or then calcined body of a tubular body having open end portions at both ends;

inserting the annular portions of said first molded or then calcined bodies into said open end portions of the tubular body, thereby forming an assembled body; and, firing the assembled body, thereby forming an integrally fired body comprised of the electrode member-inserting portion and the annular portion, whereas the annular portions and the tubular body are sintered to each other by firing in a state that radial press fitting forces act between the annular portions and the tubular body.

3. The producing process set forth in claim 1, further comprising:

preparing a first integrally molded or then calcined body composed of the electrode member-inserting portion and the annular portion;

a second integrally molded or then calcined body comprised of the tubular body with an open end portion, the annular portion provided at one end portion of the tubular body opposite to said open end portion and the electrode member-inserting portion provided at an inner side of the annular portion, the annular portion of the first molded or then calcined body is inserted into said open end portion of the second molded or then calcined body, thereby forming an assembled body; and, firing the assembled body thereby forming an integrally fired body comprised of the electrode member-inserting portion and the annular portion, whereas the annular portion of the first molded or then calcined body and the tubular body are sintered to each other by firing in a state that radial press fitting forces act between the annular portion and the tubular body.

4. The producing process set forth in claim 1, further comprising:

producing the annular portion of the first molded or then calcined body and the molded or then calcined body of the tubular body to have corresponding shapes which enable them to engage each other.

5. The producing process of claim 1, wherein a curved face is formed at a joint between the electrode member-inserting portion and the annular portion of the first molded or then calcined body.

6. The producing process set forth in any one of claims 1 to 5, wherein the first molded body and the molded tubular body are designed such that when separately fired in a state that the annular portion is not inserted into the open end portion of the tubular body, an outer diameter of the annular portion of the first fired body is greater than an inner diameter of the tubular body by 1.001 to 1.010 times.

* * * * *